(12) United States Patent
Koreeda

(10) Patent No.: US 11,252,271 B2
(45) Date of Patent: Feb. 15, 2022

(54) PORTABLE COMMUNICATION TERMINAL EQUIPMENT CASE

(71) Applicant: Hitoko Koreeda, Shimabara (JP)

(72) Inventor: Hitoko Koreeda, Shimabara (JP)

( * ) Notice: Subject to any disclaimer, the term of this patent is extended or adjusted under 35 U.S.C. 154(b) by 0 days.

(21) Appl. No.: 15/734,287

(22) PCT Filed: Oct. 9, 2019

(86) PCT No.: PCT/JP2019/039882
§ 371 (c)(1),
(2) Date: Dec. 2, 2020

(87) PCT Pub. No.: WO2020/075772
PCT Pub. Date: Apr. 16, 2020

(65) Prior Publication Data
US 2021/0227062 A1   Jul. 22, 2021

(30) Foreign Application Priority Data
Oct. 9, 2018  (JP) .............................. JP2018-191330

(51) Int. Cl.
*H04M 1/11*  (2006.01)
*A45C 11/00*  (2006.01)
*H04B 1/3888*  (2015.01)

(52) U.S. Cl.
CPC .............. *H04M 1/11* (2013.01); *A45C 11/00* (2013.01); *H04B 1/3888* (2013.01); *A45C 2011/002* (2013.01); *A45C 2200/15* (2013.01)

(58) Field of Classification Search
CPC .......... H04M 1/11; H04M 1/185; H04M 1/04; A45C 11/00; A45C 2011/002;
(Continued)

(56) References Cited

U.S. PATENT DOCUMENTS 7,881,758 B2 *   2/2011   Nagamine ........... H04M 1/0233
                                                                       455/575.1
8,042,231 B2 *   10/2011  Bae ....................... G06F 1/1622
                                                                       16/367

(Continued)

FOREIGN PATENT DOCUMENTS

JP       2017-208857 A    11/2017
WO       2017/014227 A1    1/2017

*Primary Examiner* — Lewis G West
(74) *Attorney, Agent, or Firm* — Muncy, Geissler, Olds & Lowe, P.C.

(57) ABSTRACT

A portable communication terminal equipment case attached to terminal equipment including an enclosure having a front surface and a rear surface in which a camera lens is located, the equipment case includes a case body and a support unit including a first rotary section making a support unit rotatable around an axis perpendicular to an exterior surface of the case body, a first plate-piece section integral with the first rotary section, a second rotary section rotatable around an axis parallel with the exterior surface; and a second plate-piece section coupled to one end of the first plate-piece section via the second rotary section. A rotation axis center of the first rotary section is located adjacent to other-end short side in a longitudinal direction, at which the camera lens is not located, and offset in a direction toward one of corners with respect to a middle position of the short side.

8 Claims, 20 Drawing Sheets

(58) Field of Classification Search
CPC ............ A45C 2200/15; H04B 1/3888; H04B 1/3877; F16M 13/04; F16M 13/022; F16M 11/38; F16M 2200/024; G06F 1/166; G06F 1/1632
See application file for complete search history.

(56) References Cited

U.S. PATENT DOCUMENTS

| | | | | |
|---|---|---|---|---|
| 8,602,375 | B2 * | 12/2013 | Zhao | F16M 11/38 |
| | | | | 248/371 |
| 9,462,864 | B2 * | 10/2016 | Sirichai | A45C 13/005 |
| 9,615,651 | B2 * | 4/2017 | Burns | F16M 11/041 |
| 9,847,805 | B2 * | 12/2017 | Sirichai | H05K 5/0221 |
| D863,277 | S * | 10/2019 | Payne | D14/250 |
| 10,861,212 | B1 * | 12/2020 | Legge | G06F 3/017 |
| 2014/0121092 | A1 * | 5/2014 | Schindler, II | G03G 15/6582 |
| | | | | 493/415 |
| 2015/0034781 | A1 * | 2/2015 | Kim | F16M 13/00 |
| | | | | 248/174 |
| 2016/0049981 | A1 * | 2/2016 | Jen | H04B 1/3877 |
| | | | | 455/575.8 |
| 2017/0293207 | A1 * | 10/2017 | Jeon | F16M 11/32 |
| 2019/0047697 | A1 * | 2/2019 | Kulkarni | G06F 1/1677 |
| 2019/0075922 | A1 * | 3/2019 | Rivera | G06N 5/046 |
| 2020/0398756 | A1 * | 12/2020 | Wezel | B60R 1/076 |
| 2021/0131609 | A1 * | 5/2021 | Zhao | G03B 17/563 |
| 2021/0231260 | A1 * | 7/2021 | Xie | F16M 13/04 |
| 2021/0274929 | A1 * | 9/2021 | Choi | A47B 3/002 |

* cited by examiner

[Fig. 1]
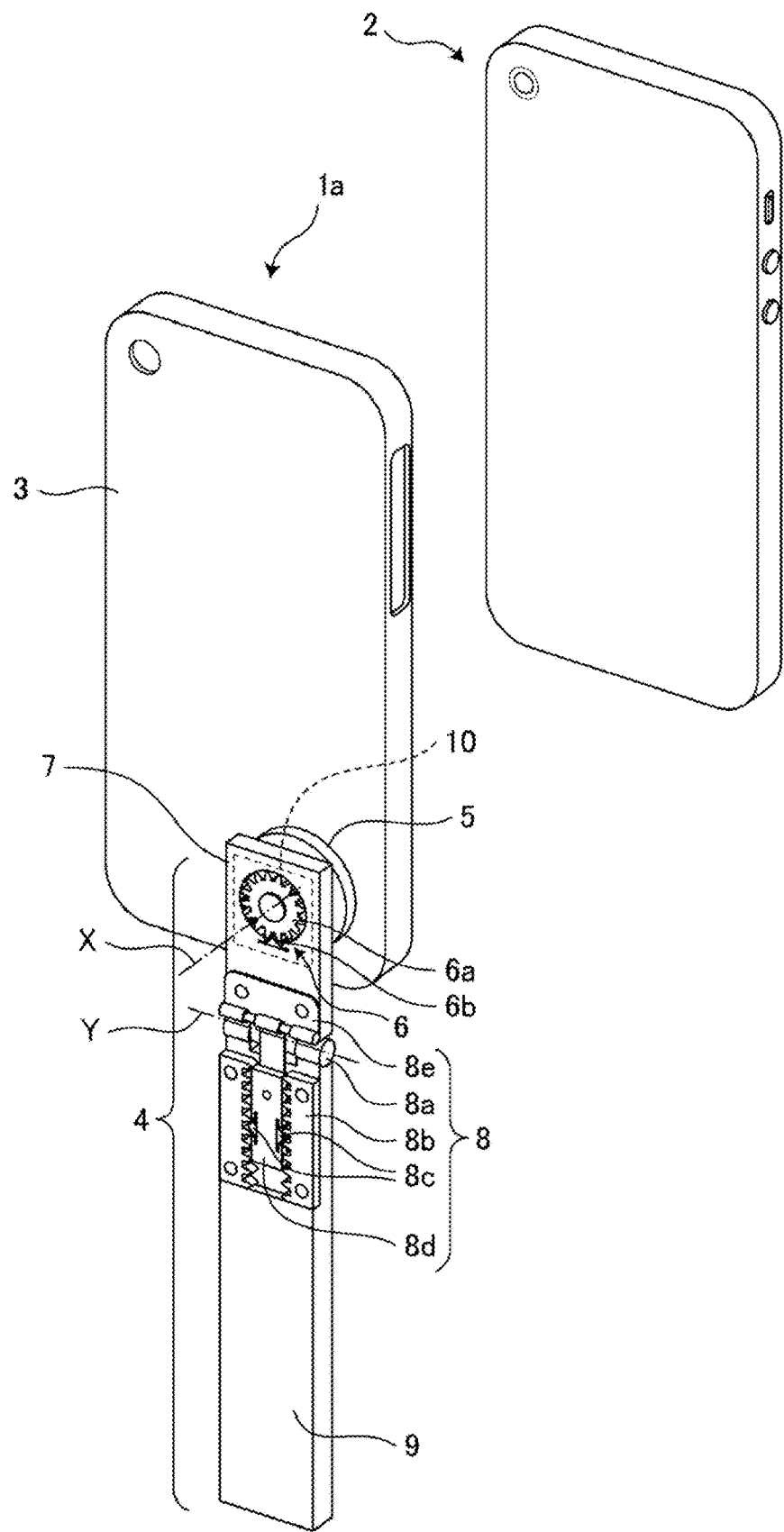

[Fig. 2]
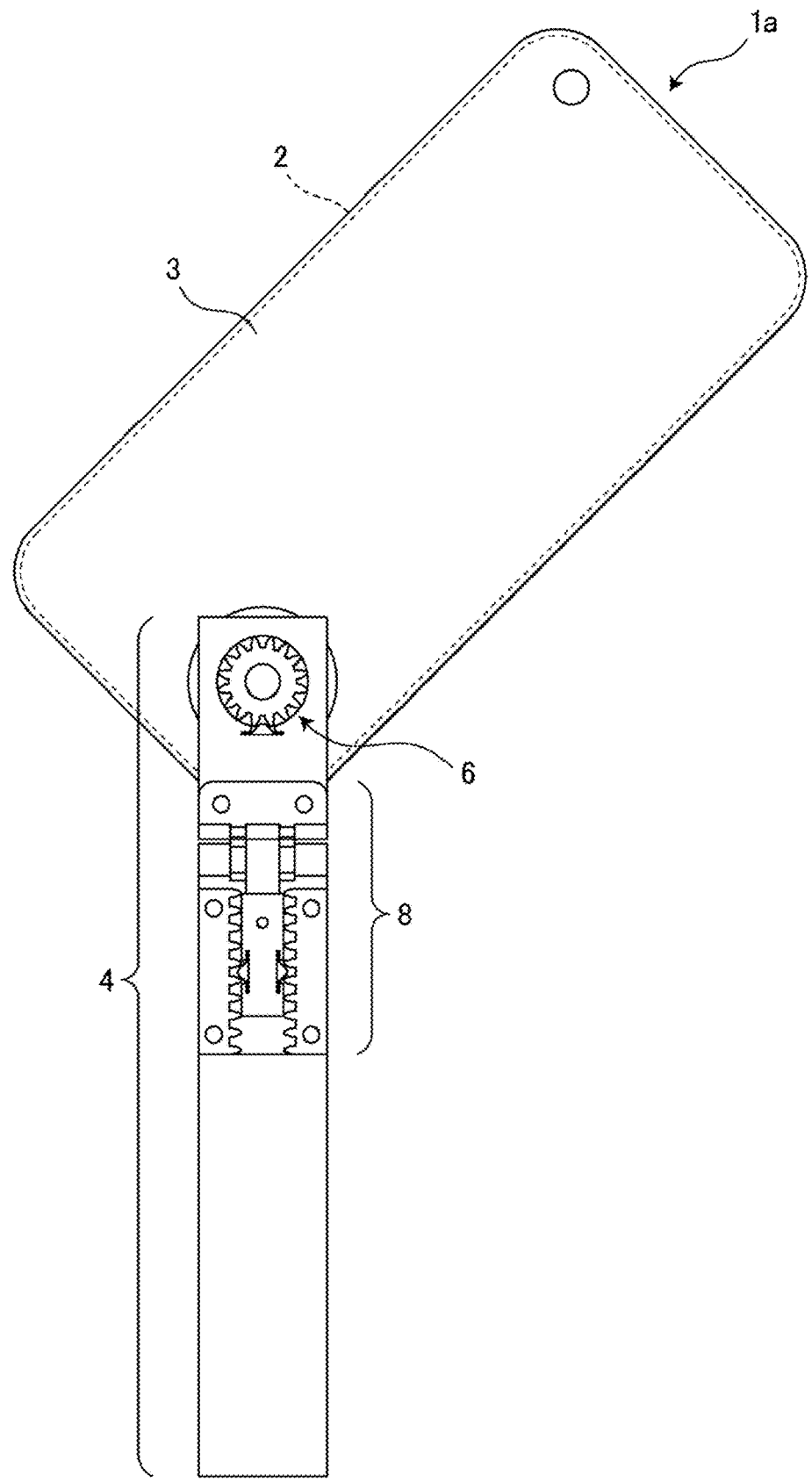

[Fig. 3]
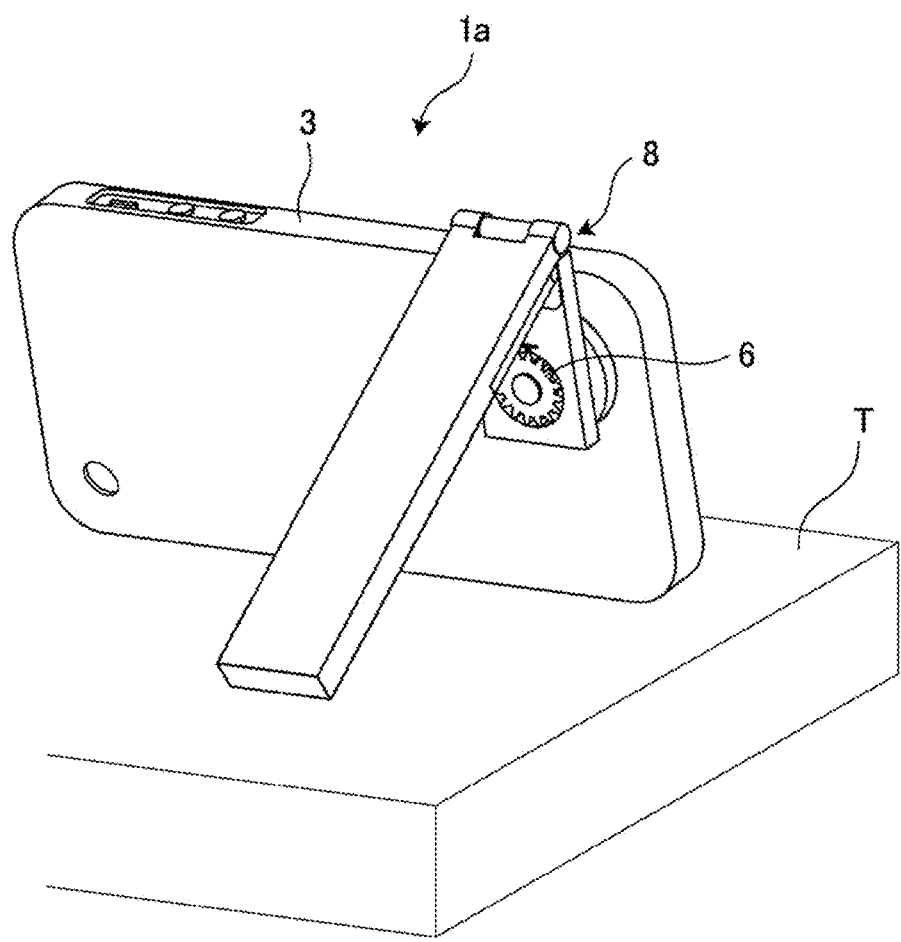

[Fig. 4]
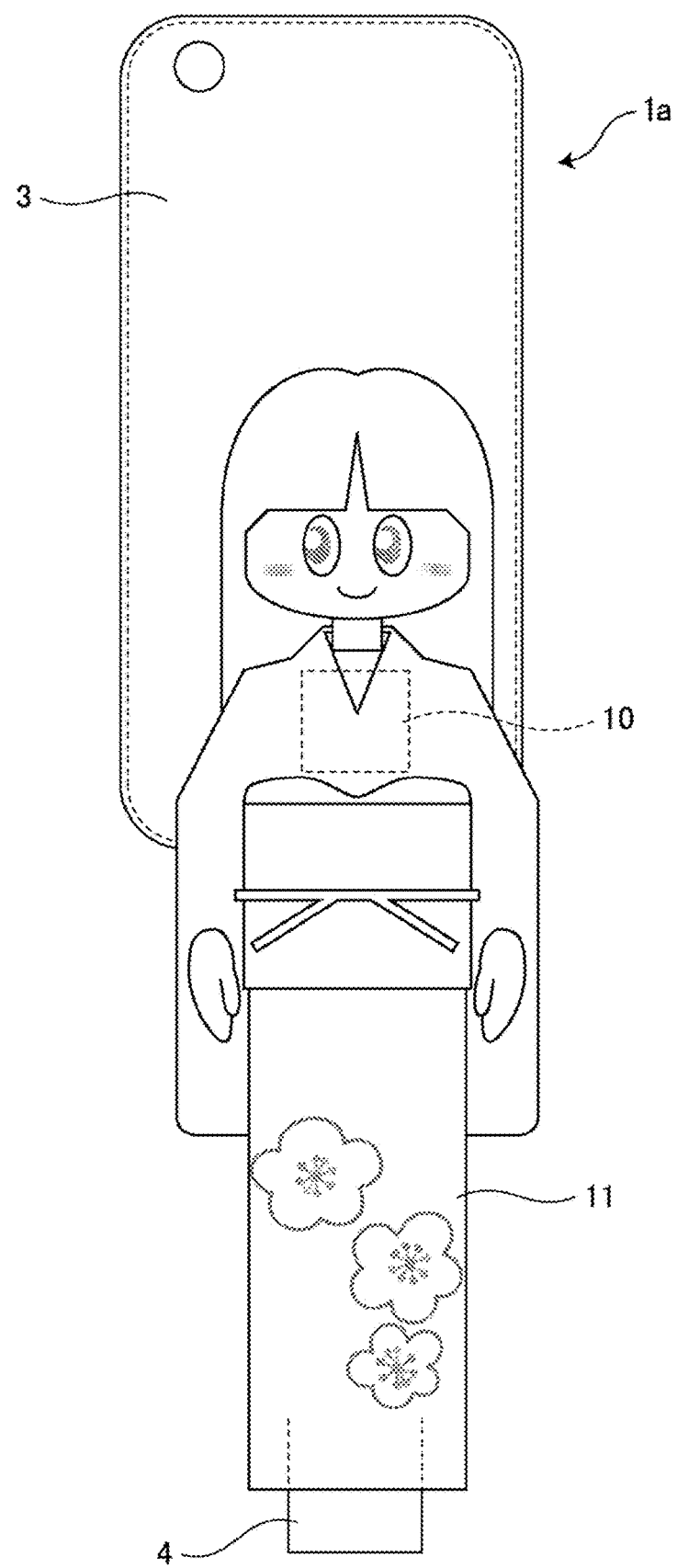

[Fig. 5]
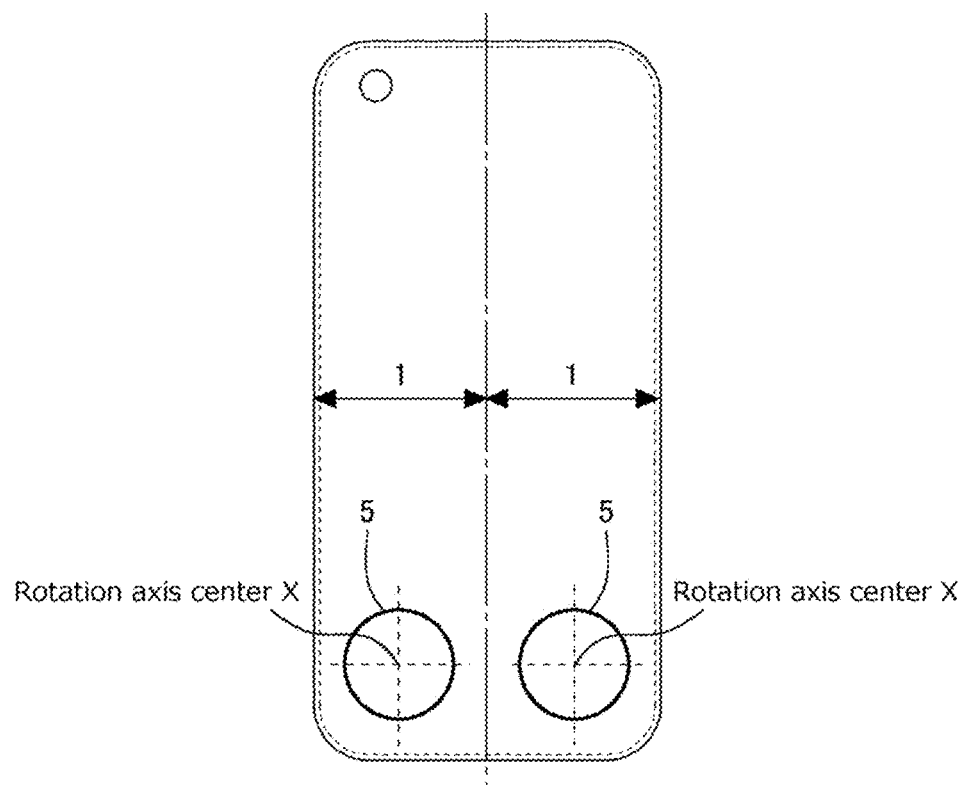

[Fig. 6]
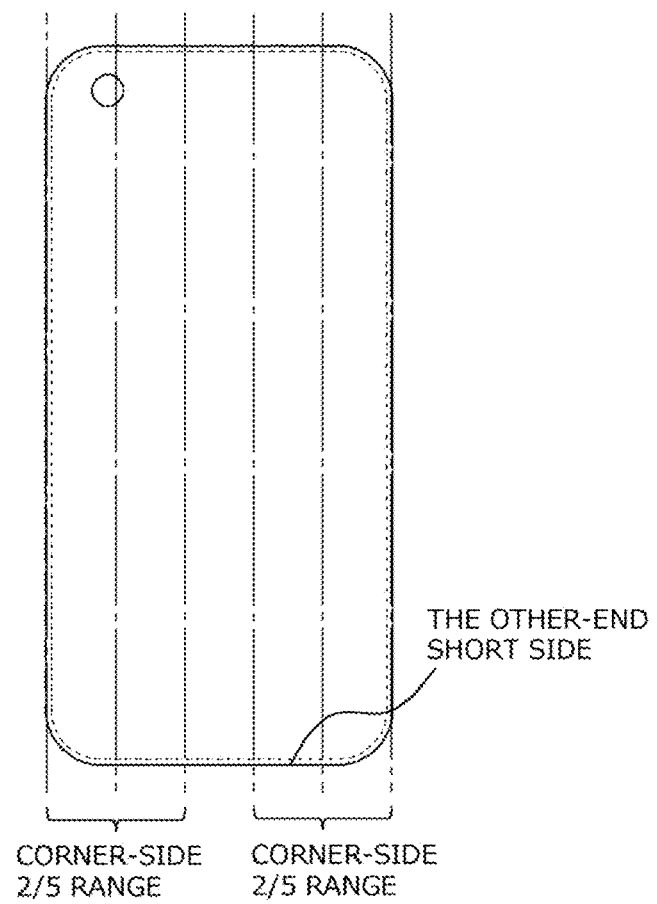

[Fig. 7]
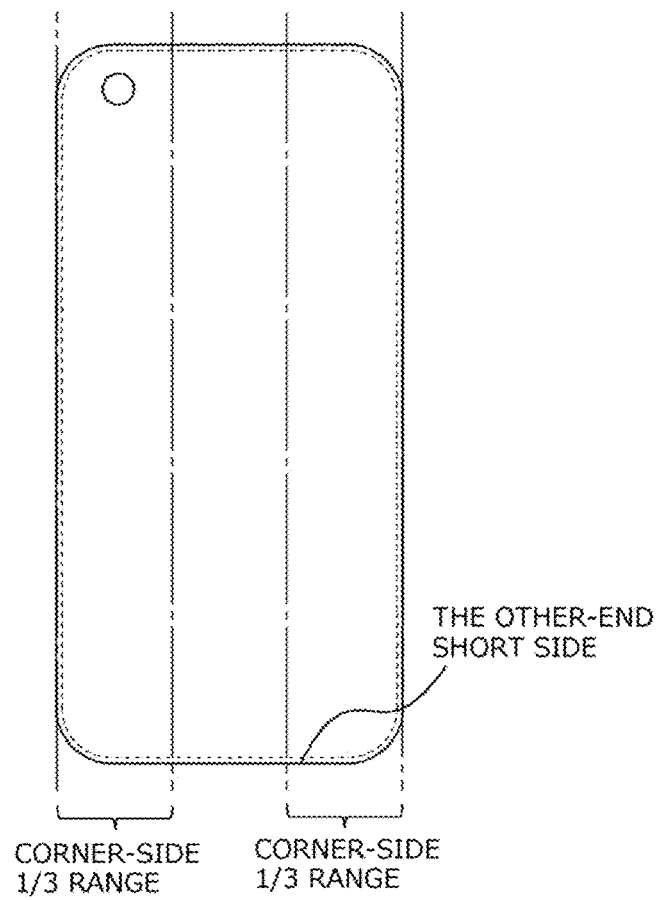

[Fig. 8]
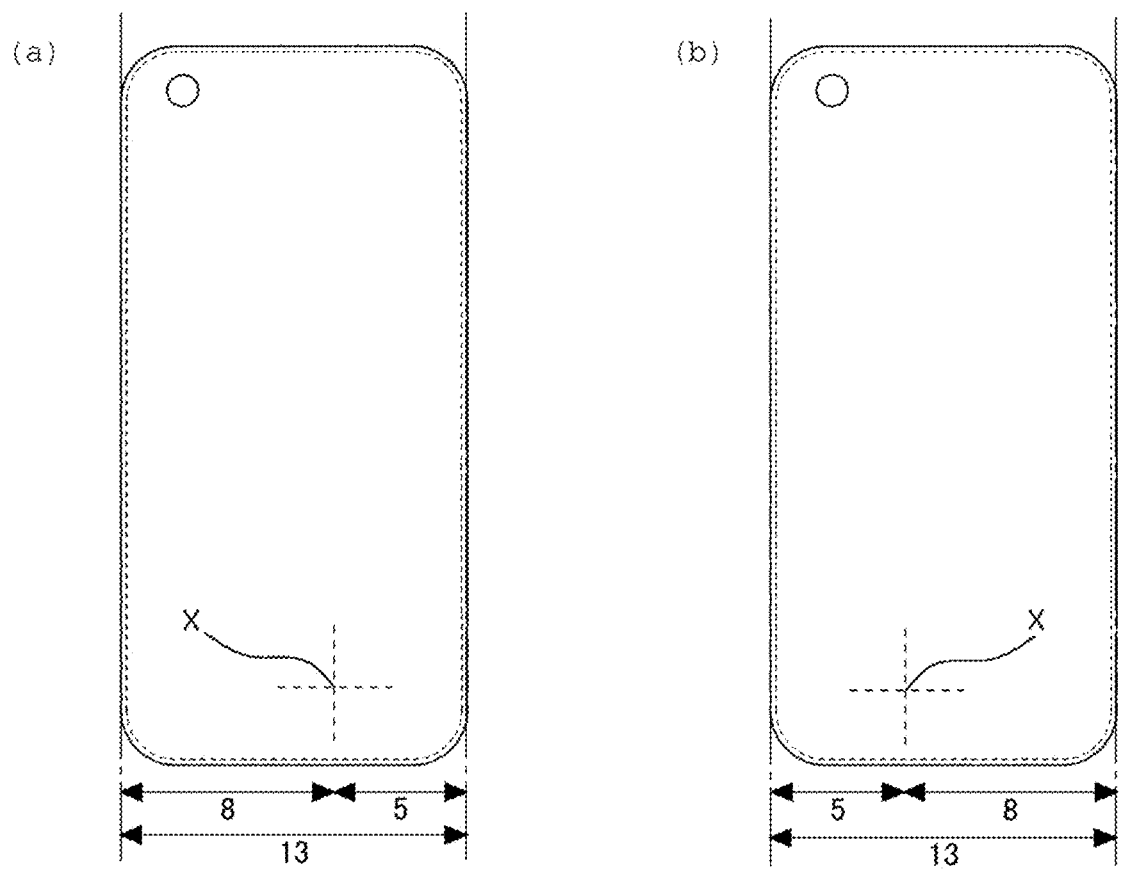

[Fig.9]
(a)
(b)
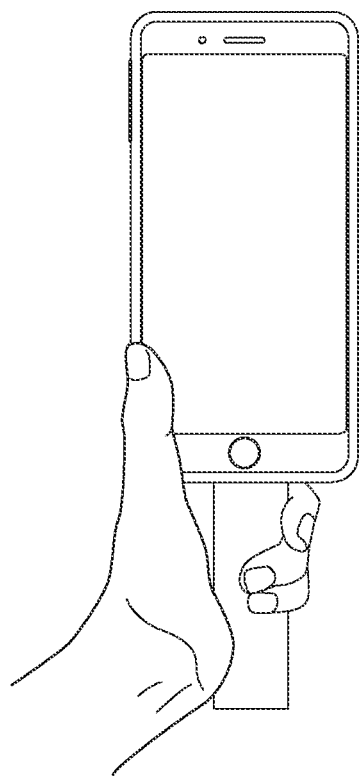
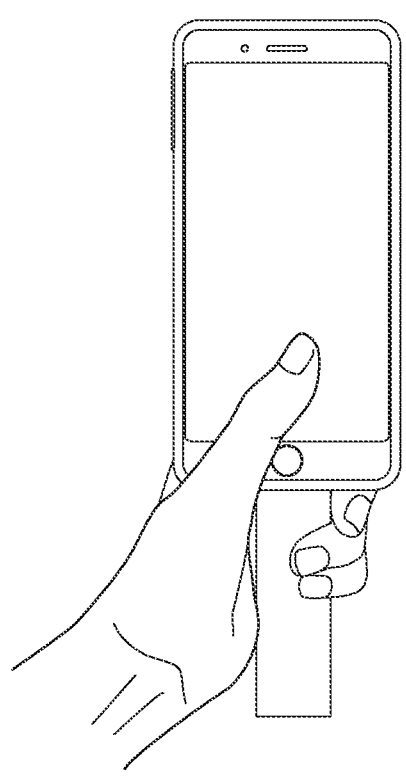

[Fig.10]
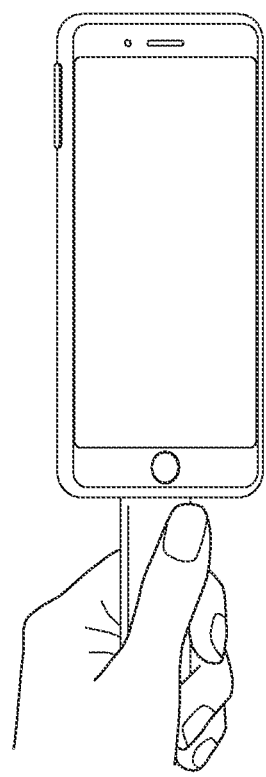

[Fig.11]
(a)
(b)
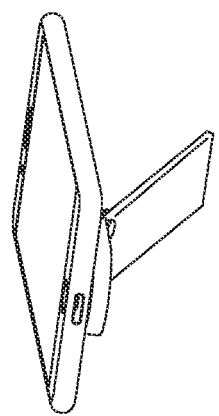
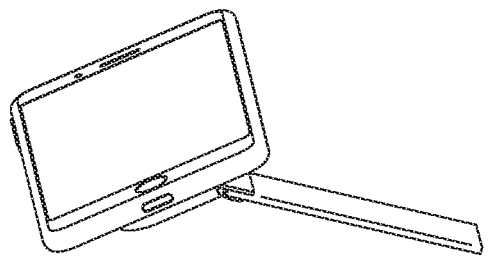

[Fig.12]
(a)
(b)
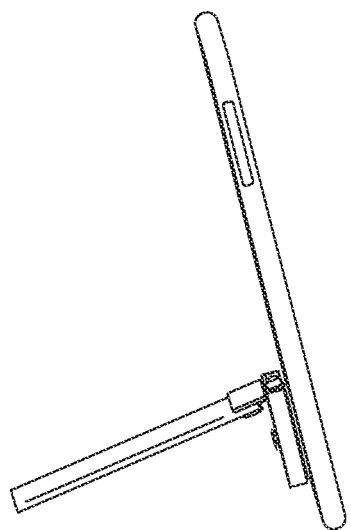
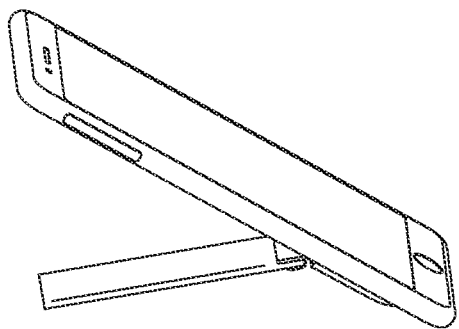

[Fig.13]
(a)
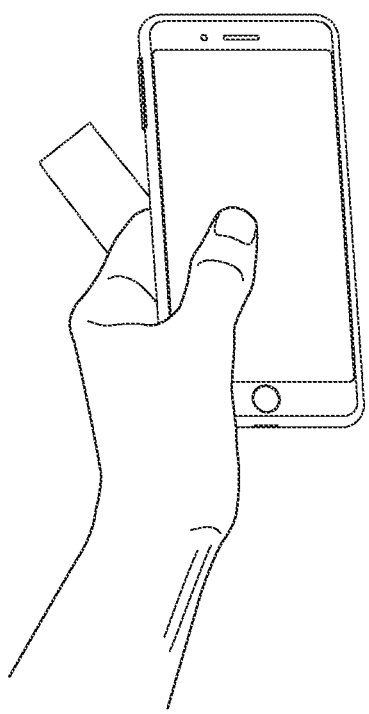
(b)
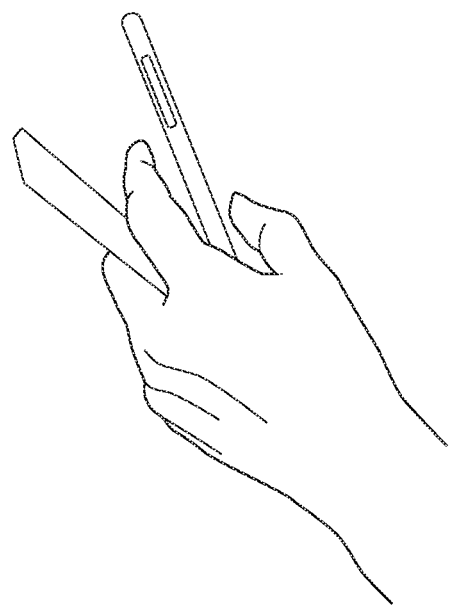

[Fig.14]
(a)
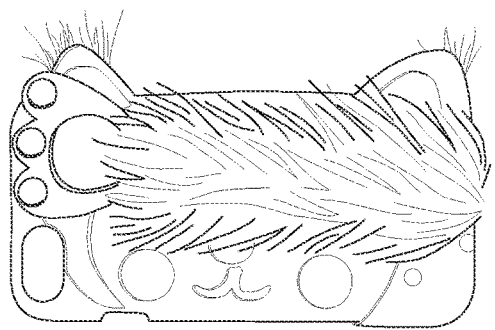
(b)
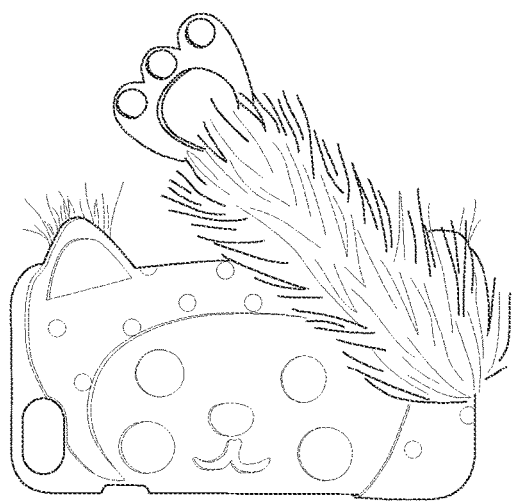

[Fig. 15]
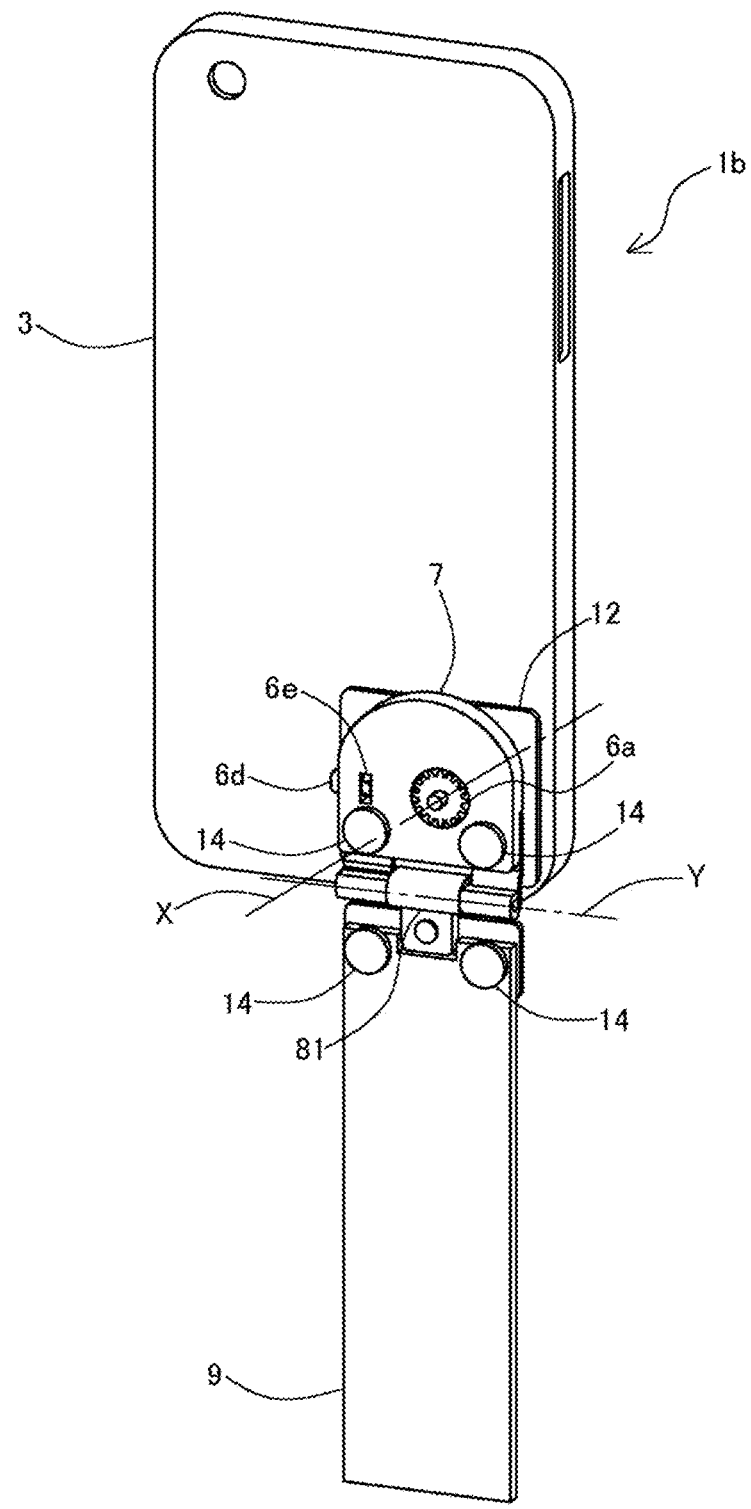

[Fig. 16]
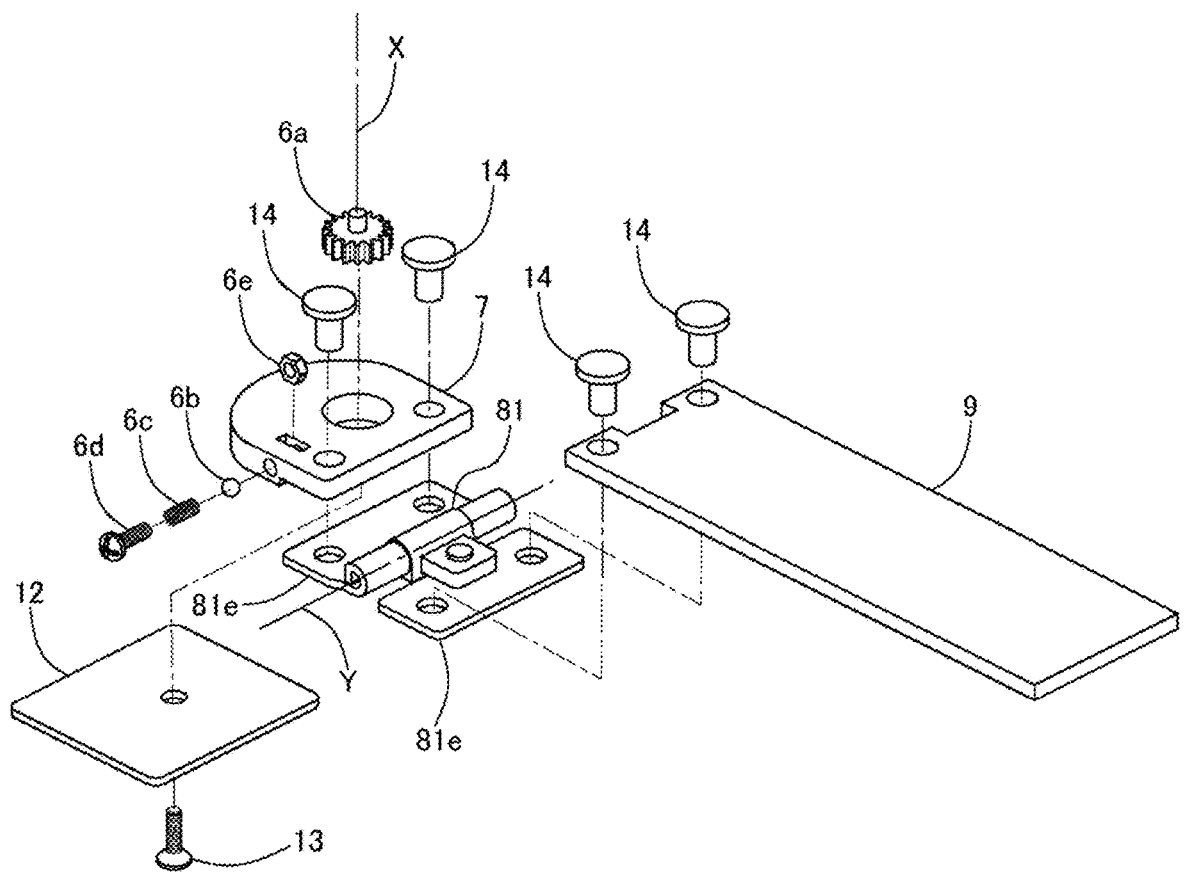

[Fig. 17]
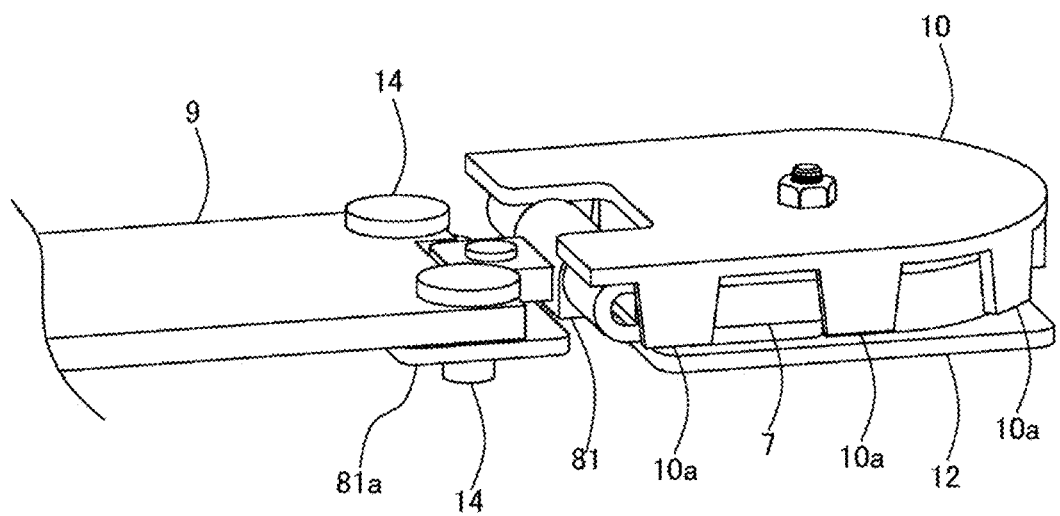

[Fig.18]
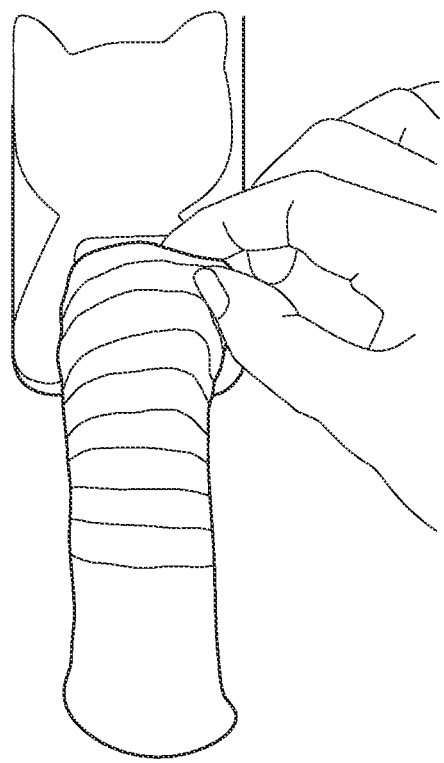

[Fig. 19]
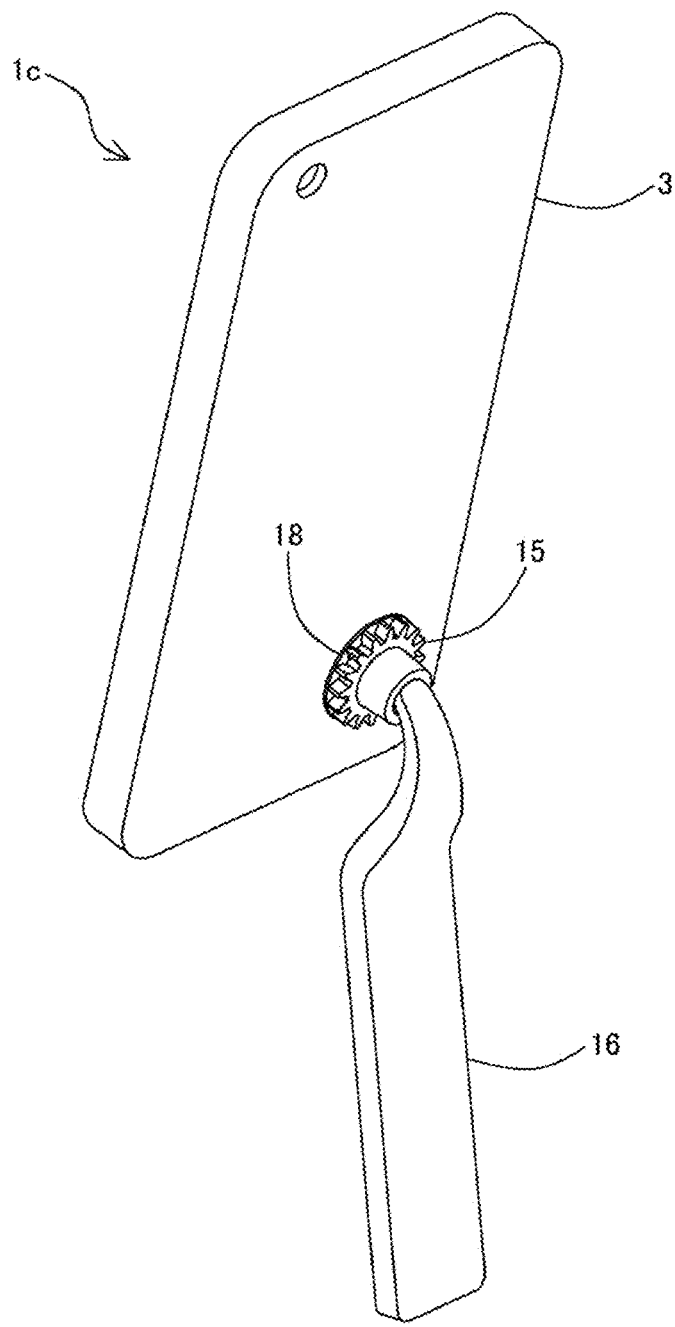

[Fig. 20]
(a)
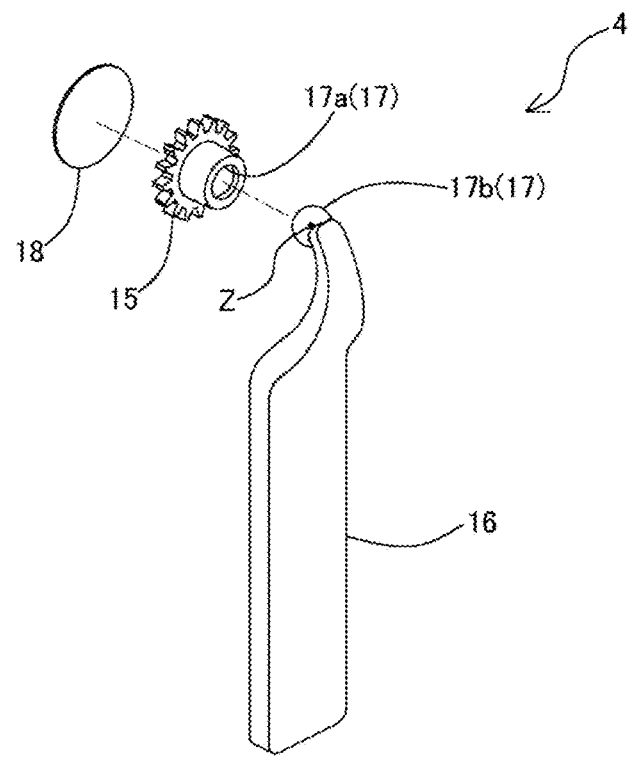
(b)
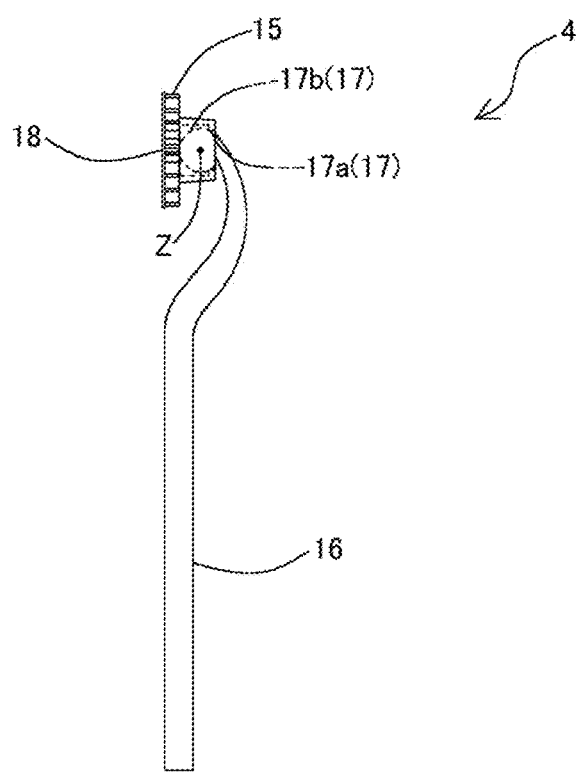

PORTABLE COMMUNICATION TERMINAL EQUIPMENT CASE

TECHNICAL FIELD

The present invention relates to a portable communication terminal equipment case including a support unit graspable with a palm.

BACKGROUND ART

Cases for housing portable communication terminal equipment such as a tablet and a smartphone to prevent damage, etc. of the portable communication terminal equipment or make the appearance of the portable communication terminal equipment distinctive (hereinafter, also referred to as "portable communication terminal equipment cases") have been widely used. Various inventions regarding such portable communication terminal equipment case have been made (for example, see Patent Literatures 1 and 2).

Patent Literature 1 discloses a technology where portable communication terminal equipment case is provided with a support unit on a rear surface of the case. The technology according to Patent Literature 1 advantageously makes it possible, for example, to take a picture of oneself during on-line video calling or the like with the portable communication terminal equipment by virtue of gripping the support unit (handle) provided on the case.

In this regard, in taking a picture by using a camera function provided in portable communication terminal equipment, it is desirable that an orientation of the portable communication terminal equipment be changeable, if necessary, so that the portable communication terminal equipment is turned into a portrait orientation or a landscape orientation or tilted only at a predetermined angle. However, in the above-described typical technology, a structure for allowing the orientation of the portable communication terminal equipment to be changed to a desired position is not taken into consideration.

In response to such a demand, Patent Literature 2 discloses a case for a portable communication terminal, the case including a case body that covers a rear surface of the portable communication terminal and a telescopic support member provided integral with a rear wall portion of the case body. Further, the support member includes a hinge section rotatably attached via a shaft and bendable in a front-and-rear direction of the case body. The technology according to Patent Literature 2, which allows, in taking a picture of oneself, the portable communication terminal to be turned into the portrait orientation or the landscape orientation or tilted at the predetermined angle with the support member being extended, advantageously makes it possible, for example, to take a picture of a photographer and a view in a desired composition with the portable communication terminal being supported at a position sufficiently distant from him/herself.

CITATION LIST

Patent Literature

Patent Literature 1: Japanese Patent Laid-Open No. 2017-208857
Patent Literature 2: International Publication No. WO 2017/014227

SUMMARY OF INVENTION

Technical Problem

However, the support member of Patent Literature 2 described above, which is configured to be telescopic in five steps as a whole by coupling five coupling pieces in a manner able to be mutually projected/housed, is structurally complicated and costly, and an increases in thickness and weight is inevitable due to limitation in weight reduction of the coupling pieces for the necessity of ensuring strength in use with extension. Moreover, even the hinge section is structurally to be housed, which makes a further increase in thickness inevitable. Thus, portability for carrying the portable communication terminal in a pocket or the like is considerably impaired. Additionally, the use with the extension of the coupling pieces is frequently restricted in public places for safety reasons.

Meanwhile, a problem of Patent Literature 2 is to eliminate the necessity of attaching and removing a selfie stick to and from a smartphone each time when taking a picture of oneself, so that a sufficiently extendable support member is necessary. However, considering that a smartphone is not inherently a device for taking a picture of oneself and, accordingly, a telephone function, a mail function, and a Web-search function should usually have priority, the support member of Patent Literature 2 is unsuitable in terms of the use frequency balance, becoming even an obstacle in inputting characters or calling with the portable communication terminal held by hand or in video calling or watching a video with the portable communication terminal set up on the desk.

Further, in Patent Literature 2, a rotation shaft is provided at a middle position in the rear surface of the case body so that the support member with a telescopic mechanism is housed without projecting from the rear surface of the case body. This, however, causes the support member to become an obstacle not only in putting the portable communication terminal into a pocket but also in charging a built-in rechargeable battery substantially at the middle position of the portable communication terminal with a wireless charger. Further, with a logo and a case design of the smartphone being hidden, excellence in design and designability are impaired.

Meanwhile, with frequency of use and time of use of a smartphone having increased in recent years, it has been pointed out as a problem that operating a touch panel with a thumb with a wrist being twisted toward a little finger results in a pain in the wrist and thumb due to fatigue and, if it worsens, tenosynovitis or deformation of the finger is caused. However, there has been, until now, no existing smartphone case intended to reduce a burden on a wrist and a thumb as described above to prevent or improve a disease associated with the operation of a smartphone. Further, a woman who carries a smartphone has sometimes applied makeup by using a selfie screen as a mirror instead of a hand mirror in recent years. However, if a smartphone with a large breadth is held with a hand, it is difficult to hold a cosmetic tool with the same hand. There is no existing smartphone case that solves such a problem, either.

The present invention has been made in view of the above-described points and an object thereof is to provide a portable communication terminal equipment case enabling changing an orientation of portable communication terminal equipment to a desired position by a simple structure without employing a telescopic mechanism so that calling, taking a picture of oneself, and shooting a video can be facilitated with the portable communication terminal equipment being reliably held, enabling reducing a burden on a wrist and a thumb in operating a touch panel to prevent or improve a possible health problem resulting from the use of a smartphone, enabling differentiation by increasing a possibility of designing the equipment case, and enabling enhancing user-friendliness in applying makeup by using a selfie screen as a mirror.

Solution to Problem

To solve problems of enabling easy hold with one hand to reduce a burden on a finger and a wrist in calling or inputting characters, ensuring a length necessary for taking a picture of oneself in a light-weight and safe manner without employing a telescopic mechanism while enabling a shutter-release button to be easily pressed irrespective of the angle at which the portable communication terminal equipment is held, and enhancing user-friendliness in a case where makeup is applied by using a selfie screen as a mirror, a portable communication terminal equipment case according to the present invention, which is to be attached to portable communication terminal equipment including an enclosure substantially in a rectangular shape having a front surface in which a display screen is located and a rear surface in which a camera lens is located near a one-end short side in a longitudinal direction, includes: a case body that is to be attached to the rear surface of the portable communication terminal equipment; and a support unit provided on an exterior surface of the case body and formed in a handle shape graspable by a user with a palm of one hand, the support unit including: a first rotary section making the support unit rotatable around an axis perpendicular to the exterior surface of the case body in increments of a predetermined angle; a first plate-piece section integral with the first rotary section and constituting a part of the handle shape; a second rotary section rotatable around an axis parallel with the exterior surface of the case body in increments of a predetermined angle at one end of the first plate-piece section; and a second plate-piece section coupled to the one end of the first plate-piece section via the second rotary section, in which a rotation axis center of the first rotary section is located adjacent to the other-end short side in the longitudinal direction, at which the camera lens is not located, and offset in a direction toward either one of corners with respect to a middle position of the short side.

To solve a problem of ensuring the length of the support unit as much as possible without employing a telescopic mechanism and allowing the support unit to be foldable within a practical range toward a screen of portable communication terminal equipment, in the portable communication terminal equipment case according to the present invention, in a case where a rotation of the first rotary section causes a rotation axis of the second rotary section to reach a position parallel with a long side or the short side of the case body, the rotation axis of the second rotary section is located at a position substantially aligned with the long side or the short side of the case body.

To solve the above-described problems, in the portable communication terminal equipment case according to the present invention, assuming that the other-end short side of the case body in the longitudinal direction is equally divided into five, the rotation axis center of the first rotary section is located within a two-fifth range from either one of the corners of the short side.

To solve a problem of ensuring the length of the support unit as much as possible without employing a telescopic mechanism and effectively displaying an aesthetic appearance of layout design, in the portable communication terminal equipment case according to the present invention, the rotation axis center of the first rotary section is located at a boundary position with assumption that the other-end short side of the case body in the longitudinal direction is divided at 5:8.

To solve a problem of ensuring the length of the support unit as much as possible in accordance with the position of the camera lens, in the portable communication terminal equipment case according to the present invention, in a case where the camera lens is located offset in a direction toward either one of corners at the one-end short side in the longitudinal direction, the rotation axis center of the first rotary section is located offset in a direction toward the corner at a position diagonal to the corner at which the camera lens is located.

To solve a problem of effectively expressing design linkage between the case body and the support unit in addition to functionality, in the portable communication terminal equipment case according to the present invention, the support unit further includes a decoration attachment section for attaching a decoration member.

To solve a problem of simply and reliably covering the whole of the support unit with the decoration member to enhance designability and allowing the decoration member to be easily replaced, in the portable communication terminal equipment case according to the present invention, the decoration attachment section is located on an upper surface of the first rotary section and includes a plurality of attachment claws projecting toward the first rotary section, a decoration member made of a stretchable/shrinkable material is engaged with the attachment claws.

To solve the problems of enabling easy hold with one hand to reduce a burden on a finger and a wrist in calling or inputting characters, ensuring a length necessary for taking a picture of oneself in a light-weight and safe manner without employing a telescopic mechanism while enabling a shutter-release button to be easily pressed irrespective of the angle at which the portable communication terminal equipment is held, and enhancing user-friendliness in a case where makeup is applied by using a selfie screen as a mirror, a portable communication terminal equipment case according to the present invention, which is to be attached to portable communication terminal equipment including an enclosure substantially in a rectangular shape having a front surface in which a display screen is located and a rear surface in which a camera lens is located near a one-end short side in a longitudinal direction, includes: a case body that is to be attached to the rear surface of the portable communication terminal equipment; and a support unit provided on an exterior surface of the case body and formed in a handle shape graspable by a user with a palm of one hand, the support unit including: a fixation plate fixed to the exterior surface of the case body; a support plate coupled to the fixation plate; and a coupling body coupling the fixation plate and the support plate to each other, the coupling body is configured by slidably fitting a substantially spherical coupling end provided at an end portion of the support plate into a coupling hole provided in an upper surface of the fixation plate, and the coupling body is located adjacent to an other-end short side in the longitudinal direction, at which the camera lens is not located, and offset in a direction toward either one of corners with respect to a middle position of the short side.

Advantageous Effects of Invention

The portable communication terminal equipment case according to the present invention enables changing an orientation of portable communication terminal equipment to a desired position by a simple structure without employing a telescopic mechanism so that calling, taking a picture of oneself, and shooting a video can be facilitated with the portable communication terminal equipment being reliably held. Further, it enables reducing a burden on a wrist and a thumb in operating a touch panel to prevent or improve a possible health problem resulting from the use of a smartphone. Further, it enables differentiation by increasing a possibility of designing the equipment case. Further, it enables enhancing user-friendliness in applying makeup by using a selfie screen as a mirror.

BRIEF DESCRIPTION OF DRAWINGS

FIG. 1 shows a first embodiment of a portable communication terminal equipment case according to the present invention.

FIG. 2 shows a first use example of the first embodiment.

FIG. 3 shows a second use example of the first embodiment.

FIG. 4 shows a fourth use example of the first embodiment.

FIG. 5 shows a position (offset in a direction toward a corner) of a rotation axis center of a first rotary section.

FIG. 6 shows a position (a ⅖ range from the corner) of the rotation axis center of the first rotary section.

FIG. 7 shows a position (a ⅓ range from the corner) of the rotation axis center of the first rotary section.

FIG. 8 shows a position (a 5:8 boundary position) of the rotation axis center of the first rotary section.

FIG. 9 shows an extent of a range of motion in performing operation with a thumb with a support unit of the first embodiment being held with one hand; (a) and (b) show before operation and after operation, respectively.

FIG. 10 shows an example of a case where calling or an input operation is performed with a right hand with the support unit of the first embodiment being held with one hand.

FIG. 11 shows the second use example of the first embodiment; (a) and (b) each show an example where a tilt angle is changed with the portable communication terminal equipment being placed in a landscape orientation with.

FIG. 12 shows the second use example of the first embodiment; (a) and (b) each show an example where the tilt angle is changed with the portable communication terminal equipment being placed in a portrait orientation.

FIG. 13 shows a third use example of the first embodiment; (a) is a front view and (b) is a side view.

FIG. 14 shows the fourth use example of the first embodiment; (a) and (b) show association and linkage between a design of a case body and a design of the support unit.

FIG. 15 shows a second embodiment of the portable communication terminal equipment case according to the present invention.

FIG. 16 is an assembly diagram mainly of a first rotary section and a second rotary section in the second embodiment.

FIG. 17 shows an example of a decoration attachment section in a second embodiment.

FIG. 18 shows an example where a decoration member is attached to the decoration attachment section in the second embodiment.

FIG. 19 shows a third embodiment of the portable communication terminal equipment case according to the present invention.

FIG. 20 shows a configuration of the support unit in the third embodiment.

DESCRIPTION OF EMBODIMENTS

Description will be made on embodiments of the present invention.

[Configuration Example of Portable Communication Terminal Equipment Case]

FIG. 1 to FIG. 4 each show a configuration example of a portable communication terminal equipment case according to a present first embodiment.

A portable communication terminal equipment case 1a shown in FIG. 1 includes a case body 3 that is to be attached to a rear surface of portable communication terminal equipment 2 such as a smartphone and a support unit 4 bonded on an exterior surface of the case body 3 near a corner. The case body 3 is a known, for example, plastic case formed substantially in a rectangular shape in accordance with a shape and a size of the portable communication terminal equipment 2 and thus description thereof is omitted herein.

The support unit 4 includes a bonding section 5, a first rotary section 6, a first plate-piece section 7, a second rotary section 8, a second plate-piece section 9, a decoration attachment section 10, etc. The support unit 4 is in a handle shape graspable by a user with a palm of one hand. The support unit 4 is bonded near one of four corners on the exterior surface of the case body 3; however, an attachment manner and an attachment position are not limited. For example, the support unit 4 may be removable and a position where the support unit 4 is to be bonded may be different from the position exemplarily shown in FIG. 1. However, in terms of workings and effects related to practicality and design, it is preferable that the support unit 4 be located near a corner of the other-end short side opposite one-end short side where a camera lens of the portable communication terminal equipment is located as described later.

The bonding section 5 is a section at which the support unit 4 is to be bonded to the exterior surface of the case body 3. An example is a double-faced tape having sticky surfaces on both sides. In particular, in a case where the bonding section 5 has sticky surfaces on both sides, one of the sides is stuck to the case body 3 and the other side is stuck to a rear surface of a later-described gear portion 6a of the first rotary section 6.

The first rotary section 6 includes the gear portion 6a bonded to the exterior surface of the case body 3 via the bonding section 5 and an engagement portion 6b in the shape of a projection engageable with one of a plurality of dedendums of the gear portion 6a. The gear portion 6a, which is, for example, a resin spur gear, is fitted in a later-described first plate-piece section 7. The engagement portion 6b, which is, for example, a tip end portion of a fine bis or the like is embedded inside the later-described first plate-piece section 7. Note that a center axis of the gear portion 6a, that is, an axis extending in a vertical direction with respect to the exterior surface of the case body 3, which is denoted as an axis X in FIG. 1, corresponds to a rotation axis center. This makes it possible to cause, in a case where the support unit 4 is rotated around the axis X, the first rotary section 6 to rotate in increments of an angle (for example, 20 degrees) between the adjacent dedendums as a result of the engagement portion 6b being engaged with each of the adjacent dedendums.

The first plate-piece section 7 is an elongated thin plate piece substantially in the shape of a flat plate in a front view and is approximately 5 mm to 7 mm in length in a nearand-far direction in the figure, namely, in thickness, approximately 3 cm to 4 cm in length in a vertical direction in the figure, and approximately 2 cm in length in a width direction in the figure. The first plate-piece section 7 constitutes a part of the handle shape of the support unit 4. One end side of the first plate-piece section 7 is provided with a columnar hole into which the above-described gear portion 6a is fitted. In other words, the first plate-piece section 7 is integral with the gear portion 6a (the first rotary section 6). The other end side of the first plate-piece section 7 is coupled to the second plate-piece section 9 via the later-described second rotary section 8. Note that the shape of the first plate-piece section 7 is not limited to a thin plate substantially in the shape of a flat plate in a front view and may be, for example, a thick plate or a columnar rod body.

The second rotary section 8, which is provided between the first plate-piece section 7 and the second plate-piece section 9, is a mechanism that enables the second plate-piece section 9 to rotate around an axis Y in a near direction in the figure in increments of a predetermined angle (for example, 20 degrees). The second rotary section 8, which is provided between the first plate-piece section 7 and the second plate-piece section 9, includes a hinge portion 8a rotatable around the axis Y, a rack portion 8b in the shape of a gear fitted in both side portions on one end side of the second plate-piece section 9, a rectangular parallelepiped sliding member 8d including an engagement portion 8c in the shape of a projection that is to be engaged with one of a plurality of dedendums of the rack portion 8b on the inside of the rack portion 8b, the sliding member 8d being slidable along addendum surfaces, and a connection member 8e formed of, for example, an elastic member such as a metal piece and in which one end side thereof is connected to the sliding member 8d and the other end side thereof fixedly attached to an end portion side of the first plate-piece section 7. This causes, in a case where the second rotary section 8 is rotated around the axis Y, the second rotary section 8 to rotate around one end surface of the first plate-piece section 7 in increments of a predetermined angle (for example, 20 degrees) as a result of the engagement portion 8c being engaged with each of the adjacent dedendums.

The second plate-piece section 9 is an elongated thin plate piece in the shape of a flat plate in a front view and is approximately 5 mm to 7 mm in length in the near-and-far direction in the figure, namely, in thickness, approximately 8 cm to 9 cm in length in the vertical direction in the figure, and approximately 2 cm in length in the width direction in the figure. The second plate-piece section 9 is longer in the vertical direction than the first plate-piece section 7 and constitutes the rest of the handle shape of the support unit 4. The above-described rack portion 8b and sliding member 8d are fitted in or located on both sides in the width direction on the one end side of the second plate-piece section 9. Note that the shape of the second plate-piece section 9 is not limited to a thin plate substantially in the shape of a flat plate in a front view and may be, for example, a thick plate or a columnar rod body. Further, the second plate-piece section 9 may be in a shape flared toward a lower end in the figure in consideration of making the second plate-piece section 9 easy for a user to grip. Moreover, the second plate-piece section 9 may be provided with an open/close section that is externally openable and closable from the outside so that, for example, medicines, cosmetics, or the like can be stored inside the second plate-piece section 9. Further, the second plate-piece section 9 may be provided with a sound generator such as a whistle so that the second plate-piece section 9 can be used as a disaster prevention tool in the case of disaster, crime, or the like. Note that it is not excluded that the second plate-piece section 9 may include a telescopic mechanism; however, considering a fact that the inclusion of the telescopic mechanism makes the structure complicated with an increase in cost and weight, a concern of weight balance and strength regarding holding the extended second plate-piece section 9, etc., it is preferable that the second plate-piece section 9 include no telescopic structure as in the present first embodiment.

The decoration attachment section 10 is a member provided on an upper surface of the first rotary section 6 and to which a predetermined decoration member 11 is attachable as shown in FIG. 4. Examples include later-described hookable attachment claws 10a in addition to Magic Tape®, a recess-side snap button, and a sticky tape enabling attachment and removal. In a case where the decoration attachment section 10 is a recess-side snap button, the decoration member 11 is attached by fitting a projection-side snap button attached to the decoration member 11 into the recess-side snap button. Note that an attachment position of the decoration attachment section 10 is not limited to the upper surface of the first rotary section 6 and may be any other position such as the second plate-piece section 9.

Here, the attachment position of the support unit 4 of the portable communication terminal equipment case 1 according to the present invention will be described in detail. As shown in FIG. 5, the rotation axis center X of the first rotary section 6 constituting the support unit 4 is located adjacent to the other-end short side in a longitudinal direction of the case body 3, at which no camera lens is located, and offset in a direction toward either one of corners with respect to a middle position of the short side. Such a position is favorable for the following reasons.

1. With the support unit 4 being located at a position distant from the camera lens, for example, the rotation of the first rotary section 6 causes the support unit 4 to orient downward in the vertical direction to be substantially the same in length as the portable communication terminal equipment 2. This makes it possible to ensure a length sufficient to grasp the support unit 4 with one hand and necessary for taking a picture of oneself without a telescopic mechanism. In addition, a shutter-release button can easily be pressed irrespective of the angle at which the portable communication terminal equipment is held.

Further, in applying makeup, it is possible to hold the support unit 4 as a hand mirror with a selfie screen displayed on the smartphone while holding a cosmetic item such as mascara or lip gross with a palm or fingers of the same hand with enhanced user-friendliness in applying makeup.

2. In storing the support unit 4, the support unit 4 can be neatly stored on the rear surface of the case body 3 without covering the camera lens located at a corner side or at the middle along the one-end short side.

3. By housing the support unit 4 in a diagonal direction of the substantially rectangular case body 3, the length of the support unit 4 can be ensured as much as possible while preventing the support unit 4 from projecting from the case body 3.

4. With the support unit 4 being elongated downward and the rotation axis center Y of the second rotary section 8 being also located near the corner (in particular, at a position substantially aligned with the long side or the short side of the case body 3), the support unit 4 can also be bent on a screen side at a practical tilt angle, so that the support unit 4 can be held so as to hold a so-called feature phone. Therefore, a weight of the portable communication terminal equipment 2 is distributed by virtue of a weight balance effect, and a call can be made while an elbow keep in contact with a side of the body instead of being raised to achieve an effect in reducing a burden on fingers and wrist with which the portable communication terminal equipment 2 is held to make the fingers and wrist unlikely to fatigue. Note that a degree of the bend of the support unit 4 on the screen side may be set as desired depending on a distance of the position of the rotation axis center Y of the second rotary section 8 from the long side or the short side and the support unit 4 can be bent up to approximately 30 degrees in a case where the rotation axis center Y located at a position substantially aligned with the long side or the short side.

5. In addition, with the rotation axis center X of the first rotary section 6 and the rotation axis center Y of the second rotary section 8 being located near the corner, the support unit 4 can be bent toward a rear-surface side of the case body 3 and grasped by sandwiching the support unit 4 between an index finger and a middle finger, and it can be grasped with the finger straddled between the case body 3 and the support unit 4 as shown in FIG. 13(*a*) and FIG. 13(*b*) of a later-described third use example. Such a holding manner allows the portable communication terminal equipment 2 to be stably held with a large range of motion of a thumb ensured, considerably facilitating operation and reducing fatigue.

6. Some types of smartphones each have a logo at a middle of a rear surface thereof. Accordingly, the logo can be exposed instead of being hidden favorably for a manufacturer and a user who wish to show the logo.

7. A large design region in the rear surface of the case body 3 can be ensured to increase flexibility in design. Further, as described later, the support unit 4 can also be reckoned as a kind of decoration means, being used to resemble a tail of an animal or express a design associated with or linked to a design of the case body 3, such as a musical instrument, a lunch box, or a leg, to provide a variety of designs in accordance with likes and tastes of a user (see FIG. 4 and FIG. 16).

8. It is convenient for charging. Specifically, in charging, the support unit 4 can be moved away from the middle position in the rear surface of the case body 3 by rotating the first rotary section 6 and thus does not need to be removed for each charging with an enhanced user-friendliness. In particular, this makes a wireless charger usable.

9. A CPU, which has a high exothermic effect, is usually located in a range from a middle portion to an upper portion of the portable communication terminal equipment 2. Accordingly, the support unit 4, the rotation axis center X of which is located near the lower corner, does not block heat release.

10. In a case where the portable communication terminal equipment 2 is wanted to be stored in a pocket, the portable communication terminal equipment 2 can be stored without being bulky by putting the case body 3 in a pocket while the support unit 4 is placed outside the pocket.

Meanwhile, in a case where the rotation axis center X is close to the middle position, it is easy to achieve a right and left weight balance in supporting the portable communication terminal equipment 2. Accordingly, the position of the rotation axis center X is selected in consideration of these workings and effects.

As a more specific example, it is preferable that assuming that the short side is equally divided into five, the rotation axis center X of the first rotary section 6 be located within a two-fifth range from either one of the corners of the short side as shown in FIG. 6. Alternatively, assuming that the short side is equally divided into three, the rotation axis center X may be located within a one-third range from either one of the corners of the short side as shown in FIG. 7. Further, as shown in FIG. 8(*a*) and FIG. 8(*b*), it is more preferable that assuming that the short side is divided at 5:8, the rotation axis center X be located at a boundary position. This is based on the golden ratio and likely to enhance an aesthetic effect in terms of location balance in addition to achieving the above-described practical merits.

Further, regarding a degree of adjacency of the rotation axis center X to the short side, the position closest to the short side is preferable within a range in which the structure of the first rotary section 6 and the above-described location of the rotation axis center X can exhibit an effect, and it is preferable that assuming the long side of the case body 3 in the vertical direction is equally divided into three, at least the rotation axis center X be located within a lower one-third range.

The above-described configuration can achieve the following effects.

1. The support unit 4 is graspable by a user with a palm of one hand. Specifically, the user can hold the portable communication terminal equipment 2 with the support unit 4 gripped in a wrapped manner with the palm of one hand. This can increase a range of motion of a thumb, with which the user performs operation, while ensuring holding stability as shown in FIG. 9(*a*) and FIG. 9(*b*).

2. The support unit 4 can be grasped as a hand mirror, allowing, in applying makeup, a cosmetic item to be held along with the support unit 4 with the selfie screen displayed on a smartphone. This enhances user-friendliness in applying makeup.

3. A smartphone, which is the portable communication terminal equipment 2, can be held without twisting a wrist toward a little finger, which reduces fatigue and also has a benefit in preventing finger deformation. In particular, a case where gripping a smartphone for a long period of time causes a pain in a wrist and a thumb has been reported in recent years. In this regard, for example, as shown in FIG. 10 and FIG. 13, it is possible to hold and talk on a smartphone with a large breadth only by holding the handle using the entire palm, and operate a touch panel with a right hand while keeping the smartphone at an eye level without raising an elbow. This is favorable for improving or preventing diseases such as finger deformity, tennis elbow (i.e., lateral epicondyle of humerus), and straight neck.

4. The portable communication terminal equipment 2 can reliably be held with the palm of one hand and thus unlikely to fall.

5. According to the present first embodiment, the support unit 4 is rotatable around the axis X of the first rotary section 6 in increments of a predetermined angle and rotatable around the axis Y of the second rotary section 8 in increments of a predetermined angle. This makes it possible to turn, for example, in taking a picture with use of a camera function of the portable communication terminal equipment 2, the portable communication terminal equipment 2 into a portrait orientation or a landscape orientation or tilt the portable communication terminal equipment 2 only at a predetermined angle to change the orientation of the portable communication terminal equipment 2, if necessary.

6. With the support unit 4 being folded on the rear-surface side of the case body 3, the portable communication terminal equipment 2 is reduced in thickness and easily put in a pocket. Further, the portable communication terminal equipment 2 may be stored in a pocket with the decorated support unit 4 placed outside the pocket so that the portable communication terminal equipment 2 can be carried with excellence in design displayed out of the pocket.

[First Use Example of Portable Communication Terminal Equipment Case]

FIG. 2 shows a first use example of the portable communication terminal equipment case 1a according to the present first embodiment. Note that the same reference signs are used to refer to components similar to those described above hereinbelow and redundant description is omitted, if necessary.

FIG. 2 shows that the portable communication terminal equipment case 1a and the portable communication terminal equipment 2 are tilted only at a predetermined angle by rotating only the first rotary section 6. As exemplarily shown in FIG. 2, such a simple mechanism where only the first rotary section 6 of the support unit 4 is rotated enables tilting the orientation of the portable communication terminal equipment 2, if necessary.

[Second Use Example of Portable Communication Terminal Equipment Case]

FIG. 3 shows a second use example of the portable communication terminal equipment case 1a according to the present embodiment.

FIG. 3 shows that the portable communication terminal equipment case 1a is placed at a tilt as a picture stand on a table T by rotating both the first rotary section 6 and the second rotary section 8. This is favorable for video calling or shooting a selfie video with the portable communication terminal equipment 2 placed on the desk. Further, in addition to such a way of use beneficial for video shooting with the portable communication terminal equipment 2 set upright, a tilt angle of the portable communication terminal equipment case 1a can be changed as desired as shown in FIG. 11(a) and FIG. 11(b). The portable communication terminal equipment 2 can thus be set at an angle easy to see the screen in accordance with a posture of a user and use environment. Further, as shown in FIG. 12(a) and FIG. 12(b), the portable communication terminal equipment 2 can be vertically erected and set at an arbitally tilt angle. As exemplarily shown in these figures, such a simple mechanism where both the first rotary section 6 and the second rotary section 8 of the support unit 4 are rotated enables changing the orientation and the tilt angle of the portable communication terminal equipment 2, if necessary.

[Third Use Example of Portable Communication Terminal Equipment Case]

FIG. 13(a) and FIG. 13(b) show a third use example of the portable communication terminal equipment case 1a according to the present embodiment.

As shown in FIG. 13(a) and FIG. 13(b), with both the first rotary section 6 and the second rotary section 8 being rotated, the support unit 4 is bent toward the rear-surface side of the case body 3 and grasped by sandwiching the support unit 4 between an index finger and a middle finger, whereby the portable communication terminal equipment 2 can be stably held with a large range of motion of a thumb being ensured and operation is facilitated with a reduced fatigue.

[Fourth Use Example of Portable Communication Terminal Equipment Case]

FIG. 4 shows a fourth use example of the portable communication terminal equipment case 1a according to the present first embodiment.

FIG. 4 shows that a dress-up costume 11, which is an example of the decoration member 11, is attached to the decoration attachment section 10 of the support unit 4. An attachment member (not shown) for attachment to the decoration attachment section 10 is provided on a rear surface (not shown) of the dress-up costume 11. In a case where the decoration attachment section 10 is one of sheets of Magic Tape®, the attachment member is the other sheet of the Magic Tape® provided on the rear surface of the dress-up costume 11 and both the sheets stick to each other. Alternatively, in a case where the decoration attachment section 10 is a recess-side snap button, the attachment member attached to the rear surface of the dress-up costume 11 is a projection-side snap button and the dress-up costume 11 is attached by fitting the projection-side snap button in the recess-side snap button.

Also, an illustration of a head, etc. of a person is decoratively provided on the exterior surface of the case body 3. Thus, in addition to the above-described advantages, the head, etc. of the person decoratively provided on the exterior surface of the case body 3 and the dress-up costume 11 attached to the decoration attachment section 10 provide a unified decorativeness as a whole. In other words, the portable communication terminal equipment case 1a can be provided with a dress-up function to expand a new industrial applicability, that is, the decoration member 11 for the portable communication terminal equipment case 1a. In addition, in a case where a costume for an upper half of a body, such as a T-shirt or a dress, is stuck to the case body 3 with a removable tape or the like and a costume for a lower half of the body, such as a skirt or pants, is removably provided on the decoration attachment section 10 of the support unit 4, a decoration design can be enjoyed by combining separated costumes for the upper half and for the lower half in a variety of manners. Further, for example, as shown in FIG. 14(a) and FIG. 14(b), with a face of a cat being expressed by the case body 3 and a hand of a cat being expressed by the support unit 4, a interrocking design can be expressed such that eyes can be hidden and unhidden. Note that the decoration member 11 is not limited to the dress-up costume 11 and may be any other subject with decorativeness such as a flower or a leg of an animal or a person.

Next, description will be made on a second embodiment of the portable communication terminal equipment case according to the present invention. Note that the same reference signs are used to refer to, among components of the present second embodiment, the components that are the same as or equivalent to the components of the above-described first embodiment and repetitive description thereof is omitted.

A portable communication terminal equipment case 1b according to the present second embodiment is characterized by replacing, among the components of the above-described first embodiment, the first rotary section 6 and the second rotary section 8 with other components. As shown in an overall configuration diagram of FIG. 15 and an assembly diagram of FIG. 16, the first rotary section 6 according to the present second embodiment includes a gear portion 6a fixed to the exterior surface of the case body 3 via a fixation section 12, a spherical engagement portion 6b to be engaged with one of a plurality of dedendums of the gear portion 6a, a small spring 6c that presses the engagement portion 6b against the dedendum, a bis 6d that presses the spring from an end portion to apply a biasing force, and a nut 6e into which the bis 6d is screwed to retain the biasing force. The gear portion 6a, which is a spur gear, is fitted in the first plate-piece section 7 and fixed with a fixing screw 13. Further, the spherical engagement portion 6b, the small spring 6c, and the bis 6d are inserted through an insertion bore provided on a side surface of the first plate-piece section 7 and fixed by screwing the bis 6d into the nut 6e, which is inserted through an upper surface hole of the first plate-piece section 7. A center axis of the gear portion 6a corresponds to the rotation axis center X as in the first embodiment. This causes the engagement portion 6b to be engaged with each of the adjacent dedendums with the rotation of the support unit 4 around the axis X, enabling the first rotary section 6 to rotate in increments of an angle between the adjacent dedendums.

The second rotary section 8 according to the present second embodiment employs a torque hinge 81 having a free stop function enabling stop at a desired position relative to the rotation axis Y. By virtue of employing the torque hinge 81, the second plate-piece section 9 can be held at a desired angle by a simple structure. The torque hinge 81 includes a pair of connection members 81e, to which the first plate-piece section 7 and the second plate-piece section 9 are fixed by fixing means such as four rivets 14, respectively. Note that the first plate-piece section 7 is formed into a thin plate piece that is substantially in the shape of a flat plate in a front view and has an arc-shaped distal end side and the second plate-piece section 9 is formed into an elongated thin plate piece in the shape of a flat plate in a front view; however, these shapes are not limitative as in the first embodiment.

Further, the second rotary section 8 according to the present second embodiment is located at a position where in a case where the rotation of the first rotary section 8 causes the rotation axis Y of the second rotary section 8 to reach a position parallel with the long side or the short side of the case body 3, the rotation axis Y of the second rotary section 8 is substantially aligned with the long side or the short side of the case body 3. This enables the support unit 4 to be also bent toward the screen side of the portable communication terminal equipment 2 at approximately 30 degrees, so that the portable communication terminal equipment 2 can be held with a good balance in a similar manner to hold a feature phone and a broad range of tilt angles can be ensured in taking a picture of oneself.

FIG. 17 and FIG. 18 each show a configuration example of the decoration attachment section 10 according to the present second embodiment. The decoration attachment section 10 includes a thin plate piece substantially in the shape of a flat plate in a front view having an arc-shaped distal end side conformable to the shape of the first plate-piece section 7. Further, a plurality of attachment claws 10a are formed along an outer edge of the decoration attachment section 10 and these attachment claws 10a are bent such that the attachment claws 10a project toward the first rotary section 6 when the decoration attachment section 10 is located on the upper surface of the first rotary section 6 or the first plate-piece section 7. The decoration member 11, which is formed of a stretchable/shrinkable material such as a knit fabric, is attached to the attachment claws 10a. Specifically, as shown in FIG. 18, as the decoration member 11, a sock-like elongated cylindrical decoration member 11 formed of a knit fabric is prepared, cover the second plate-piece section 9 from a rear end side, stretched up to the decoration attachment section 10, and fixed by hooking the decoration member 11 on the attachment claws 10a. At this time, even the first plate-piece section 7 can be fully hidden as shown in FIG. 18, so that the appearance becomes neat with an aesthetic effect being enhanced.

The present second embodiment as described above enables the first rotary section 6 and the second rotary section 8 to be provided by a thin and simple configuration in addition to achieving the workings and effects of the first embodiment described above. Further, the decoration attachment section 10 of the second embodiment enables decoration with the support unit 4 fully hidden by a simple structure. In addition, the decoration member 11 can easily be replaced depending on seasons or tastes of a user without the necessity of a mold or the like and a variety of variations of design can be enjoyed in accordance with the design of the case body 3.

Next, description will be made on a third embodiment of the portable communication terminal equipment case according to the present invention with reference to FIG. 19 and FIG. 20. Note that the same reference signs are used to refer to, among components of the present third embodiment, the components that are the same as or equivalent to the components of the above-described first embodiment and second embodiment and repetitive description thereof is omitted.

Regarding the components of the support unit 4, a portable communication terminal equipment case 1c of the present third embodiment is characterized by employing a substantially spherical coupling body 17 in place of the first rotary section 6 and the second rotary section 8. Specifically, as shown in FIG. 19 and FIG. 20, the support unit 4 includes a fixation plate 15 fixed to the exterior surface of the case body 3, a support plate 16 coupled to the fixation plate 15, and a coupling body 17 coupling the fixation plate 15 and the support plate 16 to each other.

The fixation plate 15 is bonded to the exterior surface of the case body 3. The bonding means is not limited but, in the present third embodiment, an adhesive paper 18 with an adhesive agent being applied to both sides is used for fixation. The fixation plate 15 is formed in a disc shape without limitation. Further, an outer peripheral edge of the fixation plate 15 is provided with recesses and projections in the shape of a gear, functioning as the above-described attachment claws 10a of the decoration attachment section 10 to removably attach the decoration member 11.

The coupling body 17, which has a structure for coupling the fixation plate 15 and the support plate 16 to each other, is configured by slidably fitting a substantially spherical coupling end 17b provided at an end portion of the support plate 16 into a coupling hole 17a provided in an upper surface of the fixation plate 15. The coupling hole 17a is not limited in shape as long as the coupling end 17b can be slidably held at various angles and may, for example, structurally cause the coupling end 17b to slide throughout an inner wall surface of the coupling hole 17a or have a narrowed opening so that the coupling end 17b is slidably sandwiched. Such a configuration enables the support plate 16 to be omnidirectionally held.

The support plate 16, which is formed in the shape of an elongated flat plate graspable by a user with the palm of one hand, is provided with the coupling end 17b at a distal end thereof, being coupled to the fixation plate 15 via the coupling end 17b. The shape of the support plate 16 is not limited to the elongated flat plate shape as in the first embodiment and the second embodiment and various shapes, such as a rod shape, graspable with the palm of one hand are applicable.

As shown in FIG. 19, a position of the support plate 16 according to the present third embodiment is located adjacent to the other-end short side opposite a one-end short side, at which the camera lens is located, and offset in a direction toward either one of the corners with respect to a middle position of the short side as in the first embodiment and the second embodiment. In this regard, a center Z of the coupling end 17b corresponds to the rotation axis center X of the first rotary section 6 according to the first embodiment and the second embodiment. Thus, in the present third embodiment, the coupling end center Z is located offset in a direction toward the corner of the other-end short side as shown in FIG. 5 to FIG. 8.

The third embodiment as described above enables the support unit 4 to be supported with the orientation being changed in all directions by a simple configuration and at low cost in addition to achieving the workings and effects of the first embodiment and the second embodiment described above.

The embodiments of the present invention are described above; however, the above-described embodiments each merely provide an application example of the present invention and the technical scope of the present invention is not intended to be limited to the specific configurations of the above-described embodiments. For example, in the above-described description, a case where the first rotary section 6 and the second rotary section 8 have the rotation mechanisms exemplarily shown in the figures is described but these rotation mechanisms are not limitative. Any other mechanism is also acceptable.

REFERENCE SIGNS LIST

1 portable communication terminal equipment case
2 portable communication terminal equipment
3 case body
4 support unit
5 bonding section
6 first rotary section
7 first plate-piece section
8 second rotary section
9 second plate-piece section
10 decoration attachment section
10a attachment claw
11 decoration member
15 fixation plate
16 support plate
17 coupling body
17a coupling hole
17b coupling end
81 torque hinge
X a rotation axis center of the first rotary section
Y a rotation axis center of the second rotary section
Z a center of the coupling end

The invention claimed is:

1. A portable communication terminal equipment case that is to be attached to portable communication terminal equipment including an enclosure substantially in a rectangular shape having a front surface in which a display screen is located and a rear surface in which a camera lens is located near a one-end short side in a longitudinal direction, the portable communication terminal equipment case comprising:
   a case body that is to be attached to the rear surface of the portable communication terminal equipment; and
   a support unit provided on an exterior surface of the case body and formed in a handle shape graspable by a user with a palm of one hand, the support unit including:
   a first rotary section making the support unit rotatable around an axis perpendicular to the exterior surface of the case body in increments of a predetermined angle;
   a first plate-piece section integral with the first rotary section and constituting a part of the handle shape;
   a second rotary section rotatable around an axis parallel with the exterior surface of the case body in increments of a predetermined angle at one end of the first plate-piece section; and
   a second plate-piece section coupled to the one end of the first plate-piece section via the second rotary section, wherein
   a rotation axis center of the first rotary section is located adjacent to an other-end short side in the longitudinal direction, at which the camera lens is not located, and offset in a direction toward either one of corners with respect to a middle position of the short side.

2. The portable communication terminal equipment case according to claim 1, wherein in a case where a rotation of the first rotary section causes a rotation axis of the second rotary section to reach a position parallel with a long side or the short side of the case body, the rotation axis of the second rotary section is located at a position substantially aligned with the long side or the short side of the case body.

3. The portable communication terminal equipment case according to claim 1, wherein assuming that the other-end short side of the case body in the longitudinal direction is equally divided into five, the rotation axis center of the first rotary section is located within a two-fifth range from either one of the corners of the short side.

4. The portable communication terminal equipment case according to claim 1, wherein the rotation axis center of the first rotary section is located at a boundary position with assumption that the other-end short side of the case body in the longitudinal direction is divided at 5:8.

5. The portable communication terminal equipment case according to claim 1, wherein in a case where the camera lens is located offset in a direction toward either one of corners at the one-end short side in the longitudinal direction, the rotation axis center of the first rotary section is located offset in a direction toward the corner at a position diagonal to the corner at which the camera lens is located.

6. The portable communication terminal equipment case according to claim 1, wherein the support unit further includes a decoration attachment section for attaching a decoration member.

7. The portable communication terminal equipment case according to claim 6, wherein
   the decoration attachment section is located on an upper surface of the first rotary section and includes a plurality of attachment claws projecting toward the first rotary section, a decoration member made of a stretchable/shrinkable material is engaged with the attachment claws.

8. A portable communication terminal equipment case that is to be attached to portable communication terminal equipment including an enclosure substantially in a rectangular shape having a front surface in which a display screen is located and a rear surface in which a camera lens is located near a one-end short side in a longitudinal direction, the portable communication terminal equipment case comprising:
   a case body that is to be attached to the rear surface of the portable communication terminal equipment; and
   a support unit provided on an exterior surface of the case body and formed in a handle shape graspable by a user with a palm of one hand, the support unit including:
   a fixation plate fixed to the exterior surface of the case body;
   a support plate coupled to the fixation plate; and
   a coupling body coupling the fixation plate and the support plate to each other, wherein
   the coupling body is configured by slidably fitting a substantially spherical coupling end provided at an end portion of the support plate into a coupling hole provided in an upper surface of the fixation plate, and the coupling body is located adjacent to an other-end short side in the longitudinal direction, at which the camera lens is not located, and offset in a direction toward either one of corners with respect to a middle position of the short side.

* * * * *